US008268119B2

(12) United States Patent
Merkley et al.

(10) Patent No.: US 8,268,119 B2
(45) Date of Patent: Sep. 18, 2012

(54) METHOD AND APPARATUS FOR REDUCING IMPURITIES IN CELLULOSE FIBERS FOR MANUFACTURE OF FIBER REINFORCED CEMENT COMPOSITE MATERIALS

(75) Inventors: Donald J. Merkley, Alta Loma, CA (US); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/399,854

(22) Filed: Feb. 17, 2012

(65) Prior Publication Data

US 2012/0205060 A1 Aug. 16, 2012

Related U.S. Application Data

(62) Division of application No. 09/970,389, filed on Oct. 2, 2001, now Pat. No. 8,133,352.

(60) Provisional application No. 60/241,102, filed on Oct. 17, 2000.

(51) Int. Cl.
*D21C 5/02* (2006.01)
(52) U.S. Cl. .............................. 162/56; 162/60; 162/65
(58) Field of Classification Search .................... 162/56, 162/60, 65, 181.6, 146; 106/718, 721, 737
See application file for complete search history.

(56) References Cited

U.S. PATENT DOCUMENTS

| | | |
|---|---|---|
| 1,571,048 A | 1/1926 | Garrow |
| 1,914,163 A | 6/1933 | Randall |
| 2,024,689 A | 12/1935 | Walter et al. |
| 2,030,383 A | 2/1936 | Luth et al. |
| 2,054,854 A | 9/1936 | Dreyfus |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,377,484 A | 6/1945 | Elmendorf |
| 2,645,576 A | 7/1953 | Bate et al. |
| 2,880,101 A | 3/1959 | Ulfstedt |
| 3,264,125 A | 8/1966 | Bourlin |
| 3,716,386 A | 2/1973 | Kempster |
| 3,748,100 A | 7/1973 | Forseth |
| 3,748,160 A | 7/1973 | Carbajal |
| 3,753,749 A | 8/1973 | Nutt |
| 3,836,412 A | 9/1974 | Boustany et al. |
| 3,843,380 A | 10/1974 | Beyn |
| 3,865,779 A | 2/1975 | Oya et al. |
| 3,918,981 A | 11/1975 | Long |
| 3,931,069 A | 1/1976 | Lundin |
| 3,969,567 A | 7/1976 | Occleshaw et al. |
| 3,998,944 A | 12/1976 | Long |
| 4,003,752 A | 1/1977 | Isohata et al. |
| 4,013,480 A | 3/1977 | Chumbley et al. |
| 4,088,804 A | 5/1978 | Cornwell et al. |
| 4,098,701 A | 7/1978 | Burrill et al. |
| 4,102,697 A | 7/1978 | Fukuba et al. |
| 4,138,313 A | 2/1979 | Hillstrom et al. |
| 4,177,176 A | 12/1979 | Burrill et al. |
| 4,225,383 A | 9/1980 | McReynolds |
| 4,258,090 A | 3/1981 | Moraru |
| 4,274,913 A | 6/1981 | Kikuiri et al. |
| 4,306,911 A | 12/1981 | Gordon et al. |
| 4,351,867 A | 9/1982 | Mulvey et al. |
| 4,406,703 A | 9/1983 | Guthrie et al. |
| 4,428,775 A | 1/1984 | Johnson et al. |
| 4,457,785 A | 7/1984 | Hsu et al. |
| 4,486,234 A | 12/1984 | Herr |
| 4,497,688 A | 2/1985 | Schaefer |
| 4,510,020 A | 4/1985 | Green et al. |
| 4,517,375 A | 5/1985 | Schmidt |
| 4,548,676 A | 10/1985 | Johnstone et al. |
| 4,637,860 A | 1/1987 | Harper et al. |
| 4,643,920 A | 2/1987 | McEntee et al. |
| 4,647,505 A | 3/1987 | Blackie et al. |
| 4,647,509 A | 3/1987 | Wallace et al. |
| 4,647,589 A | 3/1987 | Valone |
| 4,655,979 A | 4/1987 | Nakano et al. |
| 4,659,386 A | 4/1987 | Nagai et al. |

(Continued)

FOREIGN PATENT DOCUMENTS

AR 250022 10/1991

(Continued)

OTHER PUBLICATIONS

Babachev et al, Chemical Abstracts on STN "Plasticizing Effect of Aliphatic Amines on Cements", Build Sci Inst. Sofia Bulgaria; Epitoanyag (1972) 24(11), 430-5; Abstract only.

Berry, Craig, "Determination of the Influence of Pulp Chemical Oxygen Demand on the Flexural Strength of Cured Fibercement" (11 pgs).

Blankenhorn et al., "Temperature and Moisture Effects on Selected Properties of Wood Fiber-Cement Composites" Cement and Concrete Research 29 (1999) pp. 737-741.

Bledzki, AK, et al. "Composites Reinforced with Cellulose Based Fibres," Progress in Polymer Science, 1999, pp. 221-274, vol. 24.

Ekman, et al. "Studies on the Behavior of Extractives in Mechanical Pulp Suspensions," The Institute of Paper Science and Technology; Jun. 1990.

(Continued)

*Primary Examiner* — Mark Halpern
(74) *Attorney, Agent, or Firm* — Knobbe, Martens, Olson & Bear, LLP

(57) ABSTRACT

A method of manufacturing high purity fiber cement grades of cellulose fibers is described. Additional washing steps, coupled with an elevated temperature, are used in the process to extensively wash the pulps and remove substantially all COD components remaining in the pulps. The pulps are counter-currently washed by diffusion and dewatering at elevated temperatures following the brown stock washer systems. During the additional washing steps, the pulps are soaked in counter-current heated water for a pre-determined time and some chemicals may be introduced to chemically break down the COD components in the pulps and to make them more soluble in the aqueous solution. The additional washing steps can be performed using existing equipment at conventional pulp mills.

10 Claims, 3 Drawing Sheets

U.S. PATENT DOCUMENTS

| | | | |
|---|---|---|---|
| 4,738,723 A | 4/1988 | Frizzell et al. |
| 4,766,113 A | 8/1988 | West et al. |
| 4,806,203 A | 2/1989 | Elton |
| 4,938,958 A | 7/1990 | Niira et al. |
| 4,944,842 A | 7/1990 | Stromberg et al. |
| 4,971,658 A | 11/1990 | Henricson et al. |
| 4,985,119 A | 1/1991 | Vinson et al. |
| 5,021,093 A | 6/1991 | Beshay |
| 5,030,289 A | 7/1991 | Sattler et al. |
| 5,047,086 A | 9/1991 | Hayakawa et al. |
| 5,049,196 A | 9/1991 | Ries |
| 5,063,260 A | 11/1991 | Chen et al. |
| 5,102,596 A | 4/1992 | Lempfer et al. |
| 5,118,225 A | 6/1992 | Koch et al. |
| 5,191,456 A | 3/1993 | Sutherland et al. |
| 5,223,090 A | 6/1993 | Klungness et al. |
| 5,236,994 A | 8/1993 | Markusch et al. |
| 5,346,541 A | 9/1994 | Goldman et al. |
| 5,403,392 A | 4/1995 | Craig |
| 5,405,498 A | 4/1995 | Pease |
| 5,415,734 A | 5/1995 | Backlund et al. |
| 5,421,867 A | 6/1995 | Yeager et al. |
| 5,429,717 A | 7/1995 | Bokstrom et al. |
| 5,432,215 A | 7/1995 | Girg et al. |
| 5,465,547 A | 11/1995 | Jakel |
| 5,472,486 A | 12/1995 | Dragner et al. |
| 5,482,550 A | 1/1996 | Strait |
| 5,520,779 A | 5/1996 | Bold |
| 5,577,024 A | 11/1996 | Malkamaki et al. |
| RE35,460 E | 2/1997 | Klungness et al. |
| 5,643,359 A | 7/1997 | Soroushian et al. |
| 5,705,542 A | 1/1998 | Roffael et al. |
| 5,777,024 A | 7/1998 | Killilea et al. |
| 5,786,282 A | 7/1998 | Carter et al. |
| 5,795,515 A | 8/1998 | Fischer |
| 5,804,003 A | 9/1998 | Nishizawa |
| 5,866,057 A | 2/1999 | Roffael et al. |
| 5,871,824 A | 2/1999 | Bates |
| 5,876,561 A | 3/1999 | Tsai |
| 5,897,701 A | 4/1999 | Soroushian et al. |
| 5,945,044 A | 8/1999 | Kawai et al. |
| 5,989,335 A | 11/1999 | Soroushian et al. |
| 6,030,447 A | 2/2000 | Naji et al. |
| 6,045,057 A | 4/2000 | Moor et al. |
| 6,086,998 A | 7/2000 | Wihsmann |
| 6,138,430 A | 10/2000 | Van Acoleyen et al. |
| 6,176,920 B1 | 1/2001 | Murphy et al. |
| 6,228,215 B1 | 5/2001 | Hoffman, Jr. |
| 6,245,196 B1 | 6/2001 | Martin et al. |
| 6,325,853 B1 | 12/2001 | Hogan et al. |
| 6,344,654 B1 | 2/2002 | Lesko |
| 6,346,146 B1 | 2/2002 | Duselis et al. |
| 6,346,165 B1 | 2/2002 | Markessini et al. |
| 6,352,952 B1 | 3/2002 | Jardine et al. |
| 6,419,788 B1 | 7/2002 | Wingerson |
| 6,475,275 B1 | 11/2002 | Nebesnak et al. |
| 6,488,762 B1 | 12/2002 | Shi |
| 6,506,248 B1 | 1/2003 | Duselis et al. |
| 6,512,132 B2 | 1/2003 | Isoda et al. |
| 6,528,151 B1 | 3/2003 | Shah et al. |
| 6,562,743 B1 | 5/2003 | Cook et al. |
| 6,572,697 B2 | 6/2003 | Gleeson et al. |
| 6,613,424 B1 | 9/2003 | Putt et al. |
| 6,676,744 B2 | 1/2004 | Merkley et al. |
| 6,676,745 B2 | 1/2004 | Merkley et al. |
| 6,719,878 B1 | 4/2004 | Svedman |
| 6,749,897 B2 | 6/2004 | Naji et al. |
| 6,770,576 B2 | 8/2004 | Cook et al. |
| 6,777,103 B2 | 8/2004 | Merkley et al. |
| 6,837,452 B2 | 1/2005 | Dezutter et al. |
| 6,872,246 B2 | 3/2005 | Merkley et al. |
| 6,893,751 B2 | 5/2005 | Naji et al. |
| 6,933,038 B2 | 8/2005 | Nanko et al. |
| 6,942,726 B2 | 9/2005 | Cook et al. |
| 7,028,436 B2 | 4/2006 | Bezubic, Jr. |
| 7,081,184 B2 | 7/2006 | Wester et al. |
| 7,226,525 B2 | 6/2007 | Vrbanac et al. |
| 7,300,546 B2 | 11/2007 | Jewell et al. |
| 7,344,593 B2 | 3/2008 | Luo et al. |
| 7,455,727 B2 | 11/2008 | Trevethick |
| 8,133,352 B2 | 3/2012 | Merkley |
| 2002/0007926 A1 | 1/2002 | Jewell et al. |
| 2002/0007927 A1 | 1/2002 | Vahatalo et al. |
| 2002/0051892 A1 | 5/2002 | Laks et al. |
| 2002/0059886 A1 | 5/2002 | Merkley et al. |
| 2002/0069791 A1 | 6/2002 | Merkley et al. |
| 2002/0088584 A1 | 7/2002 | Merkley et al. |
| 2002/0121229 A1 | 9/2002 | Jardine et al. |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0164119 A1 | 9/2003 | Naji et al. |
| 2004/0043217 A1 | 3/2004 | Dezutter et al. |
| 2004/0043686 A1 | 3/2004 | Batdorf |
| 2004/0132843 A1 | 7/2004 | Baumgart et al. |
| 2004/0145078 A1 | 7/2004 | Merkley et al. |
| 2004/0168615 A1 | 9/2004 | Luo et al. |
| 2005/0016423 A1 | 1/2005 | Merkley et al. |
| 2005/0045067 A1 | 3/2005 | Naji et al. |
| 2005/0126430 A1 | 6/2005 | Lightner, Jr. et al. |
| 2005/0208287 A1 | 9/2005 | Naji et al. |
| 2005/0235883 A1 | 10/2005 | Merkley et al. |
| 2007/0077436 A1 | 4/2007 | Naji et al. |

FOREIGN PATENT DOCUMENTS

| | | |
|---|---|---|
| AR | 015457 | 9/1998 |
| AR | 014046 | 11/1998 |
| AR | 14702 | 3/1999 |
| AT | 391131 | 8/1990 |
| AU | 515151 | 3/1981 |
| AU | 2002240552 | 9/2002 |
| CA | 1177205 | 11/1984 |
| CA | 2242749 | 2/1999 |
| CA | 2405354 | 11/2001 |
| CL | 32972 | 2/1980 |
| CL | 2346-01 | 9/2001 |
| CL | 2347-01 | 9/2001 |
| CL | 2352-01 | 9/2001 |
| CL | 2353-01 | 9/2001 |
| CL | 461-02 | 3/2002 |
| CN | 1032332 | 4/1989 |
| CN | 1199116 | 11/1998 |
| CN | 1224701 | 8/1999 |
| DE | 3037220 | 4/1982 |
| DE | 3308917 | 9/1984 |
| DE | 3601736 | 7/1987 |
| DE | 4316666 | 12/1994 |
| DE | 19654836 | 6/1998 |
| EP | 0049365 | 4/1982 |
| EP | 0058263 | 7/1982 |
| EP | 0287962 | 4/1987 |
| EP | 0305209 | 3/1989 |
| EP | 0331666 | 9/1989 |
| EP | 0263723 | 2/1991 |
| EP | 484283 | 6/1992 |
| EP | 0147429 | 7/1995 |
| EP | 0716182 | 6/1996 |
| EP | 1052262 | 11/2000 |
| EP | 1088800 | 4/2001 |
| EP | 1106236 | 6/2001 |
| EP | 1155794 | 11/2001 |
| EP | 1346964 | 9/2003 |
| EP | 1334076 | 8/2006 |
| ES | 2033987 | 4/1993 |
| FR | 895184 | 1/1945 |
| FR | 1557348 | 2/1969 |
| FR | 2611432 | 9/1988 |
| GB | 22139 | 0/1901 |
| GB | 442098 | 2/1936 |
| GB | 449384 | 6/1936 |
| GB | 731597 | 6/1955 |

| | | |
|---|---|---|
| GB | 1003850 | 9/1965 |
| GB | 1536663 | 12/1978 |
| GB | 2041384 | 9/1980 |
| GB | 1604910 | 12/1981 |
| GB | 2137977 | 10/1984 |
| GB | 2307425 | 5/1997 |
| JP | 55-085756 | 6/1980 |
| JP | 59-203747 | 11/1984 |
| JP | 60-118658 | 6/1985 |
| JP | 61-019900 | 1/1986 |
| JP | 63-107849 | 5/1988 |
| JP | 01-141849 | 6/1989 |
| JP | 03-016978 | 1/1991 |
| JP | 04-182335 | 6/1992 |
| JP | 04-342746 | 11/1992 |
| JP | 05-177625 | 7/1993 |
| JP | 05-184246 | 7/1993 |
| JP | 06-024821 | 2/1994 |
| JP | 06-144911 | 5/1994 |
| JP | 06-341093 | 12/1994 |
| JP | 07-041592 | 2/1995 |
| JP | 07-109165 | 4/1995 |
| JP | 08-119708 | 5/1996 |
| JP | 2508554 | 6/1996 |
| JP | 08-260371 | 10/1996 |
| JP | 09-255385 | 9/1997 |
| JP | 10-095922 | 4/1998 |
| JP | 11-010631 | 1/1999 |
| JP | 11-099512 | 4/1999 |
| JP | 2000-044302 | 2/2000 |
| JP | 2001-240458 | 9/2001 |
| JP | 2001-316163 | 11/2001 |
| JP | 2003-335560 | 11/2003 |
| KR | 1019950008587 | 8/1995 |
| PL | 154782 | 12/1991 |
| PL | 190627 | 12/2005 |
| SE | 9604599-2 | 6/1998 |
| SU | 240472 | 3/1969 |
| WO | WO 84/04765 | 12/1984 |
| WO | WO 91/01409 | 2/1991 |
| WO | WO 95/20066 | 7/1995 |
| WO | WO 96/17996 | 6/1996 |
| WO | WO 97/08111 | 3/1997 |
| WO | WO 97/31153 | 8/1997 |
| WO | WO 98/18855 | 5/1998 |
| WO | WO 98/27027 | 6/1998 |
| WO | WO 98/45222 | 10/1998 |
| WO | WO 99/35330 | 7/1999 |
| WO | WO 00/71336 | 11/2000 |
| WO | WO 01/30927 | 5/2001 |
| WO | WO 01/68547 | 9/2001 |
| WO | WO 01/08166 | 11/2001 |
| WO | WO 01/81666 | 11/2001 |
| WO | WO 02/12623 | 2/2002 |
| WO | WO 02/18486 | 3/2002 |
| WO | WO 02/28795 | 4/2002 |
| WO | WO 02/28796 | 4/2002 |
| WO | WO 02/33164 | 4/2002 |
| WO | WO 02/070425 | 9/2002 |
| WO | WO 02/072499 | 9/2002 |
| WO | WO 2004/063113 | 7/2004 |

OTHER PUBLICATIONS

Ekman, R., "Studies on the Behavior of Extractives in Mechanical Pulp Suspensions" Nordic Pulp and Paper Research Journal No. 2 (1990) pp. 2-9, Feb. 1990.
Ekman, R., Studies on the Behavior of Extractives in Mechanical Pulp Suspensions; XP-002194276; (1990), Jun. 1990.
Harper, S., et al. "Resin Extraction and Effects on Pulp Quality," Proceedings of the 54th Appita Annual Conference, Melbourne, Apr. 3-6, 2000, pp. 575-580.
Lewis Sr., Richard, Hawley's Condensed Chemical Dictionary, Twelfth Edition, 1993 Van Nostrand Reinhold, p. 435; definition of "dispersing agent".
Locher, Friedrich W. "Fundaments of Production and Application" VBT; 2000 (w/translation).
M D Campbell and R.S.P. Coutts, "Wood Fibre-Reinforced Cement Composites," Journal of Materials Science, vol. 15, pp. 1962-1970 (1980).
MacDougall, F.H., "Reactions in Heterogeneous Systems" in Thermodynamics and Chemistry, New York, NY (1921), p. 64.
Mai et al., "Effects of Water and Bleaching on the Mechanical Properties of Cellulose Fiber Cements" Journal of Materials Science 18(1983) 2156-62.
Mai et al., "Slow Crack Growth in Bleached Cellulose Fibre Cements" Journal of Materials Science Letters 3 (1984), 127-130.
Neithalath, Narayanan, et al "Acoustic Performance and Damping Behavior of Cellulose-Cement Composites," Cement & Concrete Composites 25 (2003) (pp. 1-12).
R.S.P. Coutts, "From Forest to Factory to Fabrication, in Fibre Reinforced Cement and Concrete," ed. R.N. Swamy, E & FN Spon, London, pp. 31-47 (1992).
Rozman et al., "Improvements of Fibreboard Properties through Fibre Activation with Silane" Intern. J. Polymeric Mater., vol. 32 (1996) pp. 247-257.
Shapiro, A.D. et al.; Bumazhnaya Promyshiennost 36, 12 (1961) XP-002335287 "Manufacture of Board Resistant to Biological Degradation".
Soroushian, Parviz, "Development of Specialty Cellulose Fibers and Cementitious Matrices for Cellulose Fiber Reinforced Cement Composites" (39 pp.), Nov. 1989.
Stromberg, C.B. "Washing of Dissolved Organic Solids From Pulp" Paper Asia, Oct. 1994, pp. 32-39.
Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.
Telysheva, G., et al. "Modification of the Properties of Pulp Fibres for their Application in the Production of Composite Materials," Cellulose Chemistry and Technology, 1999, pp. 423-435, vol. 33.
Woods, Amy Lamb "Keeping a Lid on It: Asbestos-Cement Building Materials" Aug. 2000 (12 pgs) Internet article located at www.cr.nps.gov/hps/tps/recentpast/asbestosarticle.htm.
"Effect of the Extraction Temperature upon the COD value of a Cellulose Pulp" (date unknown) (author unknown) (1 pg) (w/translation).
"Forming Handsheets for Physical Tests of Pulp," TAPI, T 205 sp-95, 1995, pp. 5-7.
"Hardi-Plank and Surfaces Mold" article located at internet http://www.nefsi.org/wwwboard/messages/439.html (2 pgs) dated Jun. 13, 2003.
"Improvements in the Durability of Cellulose Reinforced Cementitious Composites," Lin et al. Mechanisms of Chemical Degradation of Cement based systems, Proceedings of the Materials Research Society's Symposium of Mechanisms, Boston, Nov. 27-30, 1995.
"Moisture in Pulp, Paper and Paperboard," TAPPI, T 412 om-94, pp. 1-3.
"Pre-extraction of hemicelluloses and subseucient kraft pulping Part I: alkaline extraction" article from TAPPI Journal (Jun. 2008) (6 pgs).
Chapter 5 "Asbestos Cement Products" pp. 25-40 (book unknown).
Chemical Abstracts "Lightweight cement moldings." American Chemical Society, Columbus, US, vol. 104:114971p., Apr. 7, 1986, XP000183799 ISSN: 0009-2258.
Chemical Abstracts, vol. 94, No. 8, Feb. 23, 1981; Columbus, Ohio; abstract No. 51915a, XP 000186251 "Building Materials With Improved Black Mold Resistance".
Database WPI Section Ch, Week 198610 Derwent Publications Ltd., London, GB; AN 1986-066741 (XP002335289).
Elastomeric Wall Coatings website article locted at http://www.energy-seal.com/es-home.nsf/products/everlast.
Finnish Forest Industries Federal "Mechanical Pulp Production" internet article located at http://english.forestindustries.fi/products/pulp/mechanical.html dated Nov. 10, 2004 (2pgs).
Force 10 Caribbean "Custom Features" Engineered Building Systems (5 pgs) 1999—article located at http://www.force-10.com/about/customfeatures.htm.
JUBOCID "Special Anti-Mildew Coatings" Sep. 2002 (4 pgs) (Technical Sheet 10).
Scan-Test Method C 45:00 "COD and TOC Removable by Washing" Scandinavian Pulp, Paper and Board Testing Committee, Revised 2000.

Scan-Test Method Cm 45:91, "Water-Soluble Organic Matter" Scandinavian Pulp, Paper and Board Testing Committee, (1991).

Thai MDF Board Co., Ltd "Beger Synotex Acrylic TM 100% Emulsion Paint" (2 pgs) 2003 article located at: http://www.thaimdf.com/paint.sub.—roofpaint.htm.

"The Trial of Antisepsis and Mothproof on Rural Timber Structure Architectures," Ming Zhou, China Wood Industry, Issue 2 of 1987, pp. 16-24.

Webster's Third New International Dictionary of the English Language unabridged, ed. Merriam-Webster, Inc. Springfield (1986).

XP002197953 & JP 2001240458A, Kamishima Kagaku Kogyo KK) Database WPI, Section Ch, Week 200212, Derwent Publications Ltd., London, GB; AN 2002-085436, Sep. 4, 2001 abstract.

Affidavit of Bill Adams, representative of Weyerhaeuser, dated Oct. 17, 1999 and accompanying documents.

Documents from the Examination Procedure of European Patent Application No. 05075809.3, submitted to European Patent Office on Aug. 1, 2008 by Opponent REDCO.

European Patent Office, Communication under Rule 71(3) EPC for EP 01973377.3 dated Jul. 7, 2010 (1 pg.) and Communication pursuant to Article 94(3) EPC for EP 01973377.3 dated Jul. 12, 2010 (4 pgs.).

European Patent Office, Communication pursuant to Rule 114(2) EPC, Observations by a Third Party in EP Application No. 01973377.3 dated Jun. 25, 2010 (3 pgs.).

European Patent Office, Communication pursuant to Rule 114(2) EPC, Observations by a Third Party in EP Application No. 01975765.7 dated Jul. 2, 2010 (13 pgs.).

European Patent Office, Communication pursuant to Rule 114(2) EPC, Observations by a third party in EP Application No. 01973377.3 dated Mar. 24, 2011.

Expert Declaration from Dr. Dahl with CV dated Jan. 28, 2009.

Expert Declaration from Dr. Roffael with CV dated Jan. 28, 2009.

Final office action mailed Jan. 16, 2008 in U.S. Appl. No. 10/753,089 (2004/0168615).

Information Disclosure Statement filed Sep. 28, 2007 and Oct. 29, 2007 in U.S. Appl. No. 10/753,089 (2004/0168615).

International Preliminary Report on Patentability for PCT/US2005/007581 dated Jun. 19, 2007.

International Search Report for PCT/AU03/01315 dated Nov. 12, 2003.

International Search Report for PCT/US05/007581 dated Aug. 3, 2005.

International Search Report for WO 02/028796 A2 dated Jul. 18, 2002.

Letter to European Patent Office from Opponent REDCO dated Aug. 1, 2008 (14 pgs., including translation).

Letter to European Patent Office from Opponent Saint Gobain dated Aug. 1, 2008 (3 pgs., including translation).

Matsushita Electric Works Ltd., unofficial translation for JP 60-118658 published Jun. 26, 1985.

Nichiha Corporation, unofficial translation for JP 2000-044302 published Feb. 15, 2000.

Notice of Opposition (filed by Redco) from the European Patent Office in Application 01977815.8-2124 and translation of Statement of Grounds, Applicant: James Hardie Int., Date: Dec. 28, 2006.

Notice of Opposition (filed by Saint Gobain) from the European Patent Office in Application 01977815.8-2124 and translation of Statement of Grounds, Applicant: James Hardie Int., Date: Feb. 1, 2007.

Observation filed by Third Party, Redco N.V., in EP No. 04700639.0-1218 dated Aug. 23, 2006.

Paper from Louisiana-Pacific Samoa, Inc. dated May 5, 1999.

Pending U.S. Appl. No. 10/070,218 entitled "Extrudable Cementitious Material" filed Jul. 19, 2002; Inventor: Peter Goodwin.

Response to final office action filed Oct. 31, 2007 in relation to U.S. Appl. No. 10/753,089 (2004/0168615).

Third Party Observation filed by Redco NV in the EPO application for .071VEP (129843.2354) filed on Aug. 23, 2006.

Written Opinion of WO 02/028796 (PCT/US01/42243) dated Feb. 4, 2003.

METHOD AND APPARATUS FOR REDUCING IMPURITIES IN CELLULOSE FIBERS FOR MANUFACTURE OF FIBER REINFORCED CEMENT COMPOSITE MATERIALS

RELATED APPLICATIONS

This application is a divisional of U.S. application Ser. No. 09/970,389 filed Oct. 2, 2001 and claims the benefit of U.S. Provisional Application No. 60/241,102, filed on Oct. 17, 2000, which are hereby incorporated by reference in their entirety.

BACKGROUND OF THE INVENTION

1. Field of the Invention

This invention relates to cellulose fibers, and more particularly, to a method of reducing impurities in cellulose fibers. This invention also discloses the formulations, methods of manufacture and final products of cellulose fiber reinforced cement composite materials using low impurity cellulose fibers.

2. Description of the Related Art

Fiber-reinforced products such as building sheets, panels, planks, and roofing material have been used in the building construction for more than one hundred years. The reinforcement fibers used in such building products include asbestos fibers, cellulose fibers such as those described in Australian Patent No. 515151 and U.S. Pat. No. 6,030,447, the entirety of which is hereby incorporated by reference, metal fibers, and glass fibers and other natural and synthetic fibers. Presently, cellulose is one of the preferred fibers used in most commercial fiber-reinforced building materials because cellulose fiber is an effective, low cost, recyclable natural product compatible with most conventional fiber cement manufacturing processes, including refining and autoclaving.

However, the properties and performance characteristics of most fiber reinforced cement composite materials are highly dependent on the quality of the fibers used. For example, cellulose fibers sometimes contain impurities that can adversely affect the fiber cement composite properties. In particular, harmful organic compounds are sometimes trapped inside the pores and cavities of the cellulose pulp during the pulping process. These organic compounds include lignin and other aromatic components, wood sugar compounds including hextoses (glucose, mannose, and galactose) and pentoses (xylose and arabinose), wood sugar derivatives such as gluconic acid and mannonic acids, fatty acids, resin acids, other organic compounds from wood including extractives and degradation fragments of cellulose, hemicellulose and lignin. In addition to organic compounds, the impurities may also include small amounts of inorganic compounds that are oxidized. These impurities are sometimes collectively referred to as Chemical Oxygen Demand (COD) components.

Each COD component has a certain degree of negative impact on fiber cement reactions, particularly the cement hydration process. The collective effect of all COD compounds released from the pulp in the manufacture of fiber cement composite materials can significantly weaken the bonding between cellulose fibers and other inorganic ingredients in the fiber cement matrix, in which cellulose fibers are typically used as the reinforcement agent. This phenomenon is sometimes referred to as cement poisoning. Moreover, accumulation of the COD impurities released from the pulp can severely contaminate the process water during the manufacture of the fiber reinforced cement composite materials. These adverse effects associated with COD impurities can ultimately result in failure of the final fiber cement products.

To address these problems, most conventional pulp manufacturing processes include a series of cleaning steps that are designed to remove residual chemicals and degraded wood components contained in the pulp. During these cleaning steps, the pulp is typically washed in a series of vacuum, rotary or pressure brown stock washers at a temperature of about 55° C. to 65° C. to remove the residual chemicals from the pulp. However, these processes often fail to remove all COD impurities from the cellulose pulp because of the relatively short retention time and limited washing efficiency. In many cases, a large amount of COD substances remains trapped inside the cavities (lumens) and pores of the fiber cell walls and are carried over to the fiber cement manufacturing processes, which can detrimentally affect the properties of the final product and severely contaminate the process water.

Hence, from the foregoing, it will be appreciated that there is a need for a process that removes substantially all impurities from cellulose fibers during the pulping process. There is also a need for a process of manufacturing low impurity and high performance cellulose fibers for fiber reinforced cement composite materials. To this end, there is a particular need for a cellulose pulp manufacturing process that significantly reduces the amount of COD components in the pulp and can be implemented by using conventional pulp manufacturing equipment.

SUMMARY OF THE INVENTION

In one aspect, the preferred embodiments of the present invention disclose a process of making low impurity and high performance fibers for cellulose fiber reinforced cement composite materials. The preferred process comprises processing the fibers in an aqueous solution for a predetermined retention time under elevated temperature conditions and providing agitation to the solution so as to facilitate diffusion of impurities from the pores and lumens of the fibers. In one embodiment, the fibers are soaked and washed counter-currently in the solution. Preferably, the solution temperature is between about 65° C. to 120° C. Preferably, the retention time is between about 1 to 36 hours. In one embodiment, processing the fibers comprises soaking the fibers in a series of washing systems, preferably, for about 30 minutes to 2 hours in each of the series of washing systems.

In another embodiment, processing the fibers comprises soaking the fibers in up to six reactors. The reactors may be bleaching towers or a series of continuous plug flow bleaching reactors. The fibers can be soaked in a bleaching reactors followed by soaking in a bleached stock washer. Preferably, the process removes a large portion of the impurities, such as COD compounds, from the pulps. In one embodiment, processing the fibers comprises introducing at least one chemical to the solution, wherein the chemical reacts with the COD compounds and causes the compounds to become more soluble in the aqueous solution. The chemicals can be selected from the group consisting of chemicals comprising oxygen, ozone, hydrogen peroxide, and mixtures thereof. Furthermore, the fibers can be washed in a brown stock washer system, preferably at an elevated temperature of greater than about 65° C., prior to processing the fibers. Preferably, the pulps are maintained at a pulp consistency of about 1% to 30%. During the prolonged soaking cycles, impurities in the pulps will diffuse from inside of the fiber cell walls driven by the concentration gradients. Furthermore, elevated temperatures also significantly increase the diffusion transportation rate of the impurities.

The process of the preferred embodiments can be carried out using various schemes and equipment systems such as existing bleaching and washing system in most pulp mills. Preferably, the washing systems are selected from the group consisting of washers, storage tanks, reactors, mixers, agitators, pumps, centrifuges, and filter presses. The washing systems may include bleaching reactors, bleached stock washers, pulp transport pumps, pulp dispersion/diffusion screw feeders, stock mixers and agitators, bleached stock storage towers, and bleached stock deckers.

The process described herein is particularly innovative because the conventional wisdom in the fiber processing industry actually teaches away from the use of high temperature, lengthy soaking cycles and mechanical agitation in cleaning pulps for the applications in the fiber cement composite material. It is generally believed that high temperature, prolonged soaking, and mechanical actions will reduce the fiber strengths, such as tensile strengths. Contrary to customary wisdom, preferred embodiments of this invention show that washing pulps at an elevated temperature under preferred conditions can effectively remove more impurities from the fiber pulps without compromising the fiber strength and other desirable fiber properties. For example, COD contents in the pulps processed by the preferred methods can be reduced by more than about 40%, resulting in a COD content of less than about 5 kg/ton of oven dry fiber. Application of the high purity fiber with a COD content of less than about 5 kg/ton of pulp in the manufacture of fiber reinforced cement composite materials actually improves the physical and mechanical properties of the fiber cement composite materials, such as modulus of rupture (MOR), modulus of elasticity (MOE), ultimate strain and toughness energy. Furthermore, use of the low COD fibers can also greatly reduce contamination of the process water during the manufacture of fiber reinforced cement composite materials.

Advantageously, the process of the preferred embodiments provides a cost effective method of removing substantially all impurities, such as COD components, from the fibers. The process can be performed using existing equipment available in most pulp mills. Furthermore, application of this process in the manufacture of fiber cement grade pulps can reduce the COD content by up to one half or more without degrading the physical and mechanical properties of the fibers. Use of the low COD pulp in the manufacture of fiber cement composite materials will result in less contamination to the process water and reduce the fresh water usage.

The preferred embodiments of the present invention also disclose a formulation for making fiber reinforced cement composite materials with low COD fibers. One preferred formulation of the present invention is as follows:
   about 2% to 20% low COD cellulose fibers (or a combination of low COD fibers, natural inorganic fibers; and/or synthetic fibers);
   about 10% to 80% cementitious or other hydraulic binders;
   about 20% to 80% silica or other aggregates;
   about 0% to 50% lightweight density modifiers; and
   about 0% to 10% additives.

The preferred embodiments of the present invention disclose a method of manufacturing a fiber reinforced composite material using low COD fibers. The first step of this method is to prepare a low COD fiber by reducing impurities in cellulose fibers. This is preferably accomplished by treating the fibers in an aqueous solution for a predetermined reaction time, while maintaining the solution temperature greater than about 65° C., and providing agitation to the solution so as to facilitate diffusion of impurities from the pores and lumens of the fibers. The method of manufacturing fiber cement in accordance with the embodiments preferably includes the steps identified above, and the following additional steps:
   processing (fiberizing, dispersing, defibrillating, etc.) the low COD fiber;
   mixing the fibers with a cementitious binder and other ingredients to form a fiber cement mixture;
   forming the fiber cement mixture into a fiber cement article of a pre-selected shape and size; and
   curing the fiber cement article so as to form the fiber reinforced composite building material.

In another aspect of the present invention, a pulping process is provided. This process comprises providing a delignified fiber substance and converting the fiber substance into fiber pulps. The pulps are washed at elevated temperatures greater than about 65° C. in a manner so as to remove a large portion of COD components from the pulps. The pulps are processed in additional washing cycles to remove substantially all remaining COD impurities.

The advantages of using the low COD fibers in the manufacture of fiber reinforced cement composite materials in accordance with the preferred formulations and processes include but are not limited to:
   improvements in mechanical and physical properties such as modulus of rupture (MOR), modulus of elasticity (MOE), ultimate strain and toughness energy;
   less process water contamination due to the impurities dissolved from the cellulose pulps and less fresh water required;
   less fibers are required to achieve the same reinforcement efficiencies.

These and other objectives and advantages will become apparent from the following description taken in conjunction with the accompanying drawings.

DETAILED DESCRIPTION OF THE PREFERRED EMBODIMENTS

The preferred embodiments of the present invention describe the preparation and application of low impurity fibers in cementitious fiber reinforced composite materials. These embodiments encompass not only the method of removing COD components from fibers, but also the formulation and the methods of manufacture of fiber reinforced composite materials formed from low COD and high purity fibers, as well as the properties of the final products. The treatment to remove impurities from pulps can also be implemented in conjunction with other fiber treatments. Further details on related chemical treatments of fibers are found in Applicant's U.S. Pat. No. 7,815,841 entitled FIBER CEMENT COMPOSITE MATERIALS USING SIZED CELLULOSE FIBERS; U.S. Pat. No. 6,777,103 FIBER CEMENT COMPOSITE MATERIALS USING BIOCIDE TREATED DURABLE CELLULOSE FIBERS; and U.S. Pat. No. 6,676,744 FIBER CEMENT COMPOSITE MATE- RIALS USING CELLULOSE FIBERS LOADED WITH INORGANIC AND/OR ORGANIC SUBSTANCES, the entirety of each of these applications being hereby incorporated by reference. It will be appreciated that the aspects of the present invention are not applicable solely to cellulose fiber reinforced cementitious products, and accordingly, the techniques described herein may be applied to building materials reinforced with other fibers in non-cement products as well.

Figure 1:
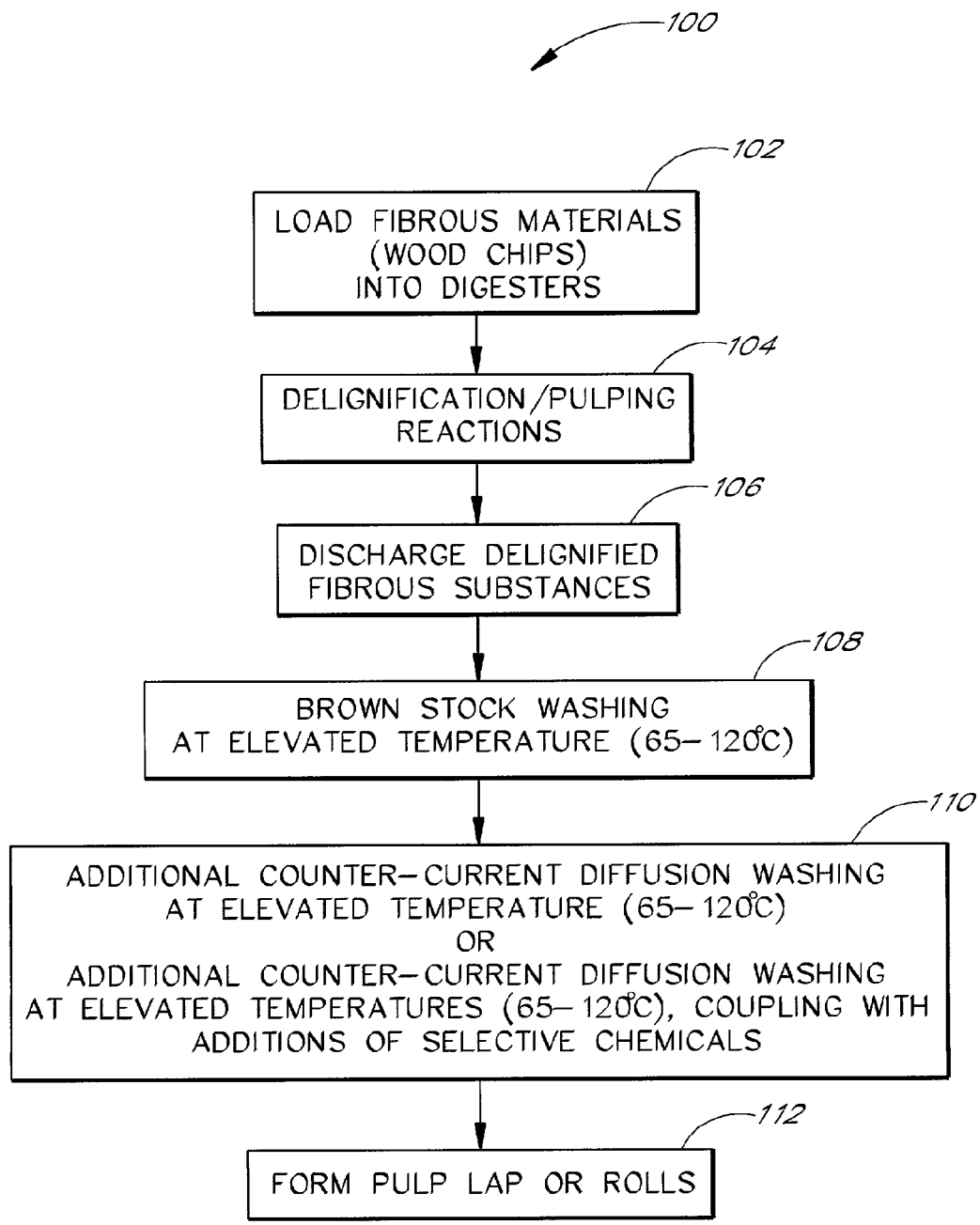
FIG. 1 is a flow chart of a preferred process of manufacturing fiber cement grade cellulose pulps in which the COD content in cellulose pulps is substantially reduced.

FIG. 1 illustrates a preferred process 100 for manufacturing fiber-cement grades of low impurity and high performance cellulose pulps. The process 100 begins with step 102 in which fibrous materials such as wood chips are loaded into a digester/reactor for delignification. After the wood chips are loaded into the digester(s), a selected amount of one or more chemicals are introduced to the digester(s) in step 104 to facilitate the delignification reactions. Dependent on the pulping processes, the chemicals may include sodium hydroxide, sodium hydroxide with sodium sulfate, sodium hydroxide with sodium sulfate plus additive AQ, sodium hydroxide plus additive AQ, and sulfur dioxide. Preferably, the delignification reaction occurs in the digester(s) under high temperature conditions between about 150° C. to 250° C. for about 30 minutes to 5 hours. In some embodiments, process conditions such as alkali usage, cooking temperature or target Kappa numbers, etc. in the digester may be adjusted to accommodate the subsequent washing steps.

As shown in FIG. 1, subsequent to the delignification reaction, the processed wood chips are discharged from the digester to a tank in step 106, utilizing the high-pressure differentiation inside and outside of the digester. With help of chip expansion due to the pressure drop, the processed chips are separated into individual fibers known as pulp during the discharge. The pulp formed at this stage is typically brown in color and thus commonly known as brown stock.

As FIG. 1 further illustrates the pulp subsequently undergoes a series of washing steps in step 108. Preferably, the pulp is washed in counter-current by a series of vacuum, rotary or pressurized brown stock washers at an elevated temperature to remove a large portion of the residual chemicals and degraded wood components contained in the pulp. Unlike conventional pulp washing cycles that are typically carried out without applying any heat, the preferred washing process is carried out at elevated temperatures, preferably greater than about 65° C., more preferably between about 65° C. and 120° C., which can be conveniently implemented using existing equipment and does not cause any substantial damage to the fibers. Some chemicals may also be added in this step to facilitate the washing and increase the washing efficiency. The chemicals that can be used include oxygen, ozone, and hydrogen peroxide, etc. A majority of the impurities residing outsides of fibers can be removed by this step.

Following the washing step 108, the process 100 further includes an additional diffusion washing process in step 110 in which the pulp is subject to further intensive washing to remove substantially all of the remaining impurities, such as COD components, that have not been removed by the brown stock washers. Preferably, the pulp is subject to an intensive counter-current washing scheme at normal or elevated temperatures with mild mechanical agitations. The extensive washing can be carried out by using a variety of different washing systems such as washers, storage tanks, reactors, mixers, agitators, pumps, centrifuges, filter presses or any combinations of these systems. In a preferred embodiment, the washing is performed using the existing equipment in the bleaching plants of most fiber cement pulp mills. In particular, the equipment used may include, but is not limited to, the following:

bleaching reactors;
bleached stock washers;
pulp screw feeders;
stock mixers/agitators;
bleached stock storage towers;
bleached stock deckers; and
medium and low consistency pumps.

Preferably, heated fresh water is introduced to the washer system counter-currently to minimize water usage and maximize washing efficiency. Furthermore, the COD containing spent water from the washers is preferably transported to a water treatment plant or chemical recovery system.

In one embodiment, step 110 comprises soaking the pulp in a series of continuous plug flow or semi-continuous bleaching reactors for a prolonged duration at an elevated temperature between about 65° C. to 120° C. for a retention time of between about 30 minutes to 2 hours in each of the reactors followed by a dewatering process after each reactor. Preferably, each reactor is followed by a washing system to remove the COD containing water. The cumulative retention time of the pulp in all reactors preferably does not exceed about 36 hours, more preferably between about 2 to 30 hours. This allows substantially all CODs and other impurities to diffuse out of the fibers without compromising the fiber strength. Furthermore, the pulp in the reactors is preferably maintained at a pulp consistency of about 1% to 30%. Advantageously, the high temperature washing coupled with the prolonged retention time allows the remaining CODs and other impurities to diffuse out from inside of the fiber cell walls and lumens. Furthermore, mechanical agitation provided by the bleaching reactors also facilitates the removal of the COD components and other impurities from the pulp.

In another embodiment, step 110 comprises processing the pulp through a bleached stock washer followed by one or more bleaching reactors. The bleached stock washer may be vacuum, pressure, rotary or diffusion types and is utilized to further separate COD compounds from the fiber. The bleached stock reactor may include those used for oxygen delignification, chlorination, alkaline extraction, chloride dioxide bleaching, hyperchlorite bleaching, ozone bleaching, hydrogen peroxide bleaching, sodium peroxide bleaching and the like. To increase the efficiency of COD removal, the pulp is preferably processed through multiple pairs of bleaching reactors and bleached stock washers in series and/or in parallel.

In yet another embodiment, chemicals are introduced into the pulp slurry during the extensive washing process of step 110 to facilitate the removal of the COD impurities during washing. Preferably, the chemical(s) selectively react with the COD components and break the components down into smaller fragments. The chemicals may comprise oxygen, ozone, hydrogen peroxide, or any others that are capable of reacting with COD compounds and causing the compounds to become more soluble in aqueous solutions. Advantageously, the addition of these chemicals in the extensive washing process of step 110 significantly increases the efficiency of COD removal. Furthermore, the extensive washing process of step 110 can be applied to a variety of different pulping processes including, but not limited to:

Kraft;
Kraft-AQ;
Soda;
Soda-AQ;
Kraft-Oxygen;
Oxygen Delignification;
Organic Solvent Pulping;
Sulfite Pulping;
Steam Explosion Pulping; and
Other pulping techniques.

Following the extensive washing process of step 110, the pulp is transported to pulp machines to form pulp laps or rolls in step 112 for making fiber reinforced cement composite materials.

Table 1 illustrates a comparison between the fiber properties of pulp processed by the pulp manufacturing process of the preferred embodiments and those processed by conventional regular temperature washing techniques. In this particular example, the wood species was predominantly Douglas fir (>90%) and the pulping process used was Kraft. For pulp samples made in accordance with the preferred process, six bleaching reactors including oxygen delignification and peroxide bleaching reactors and the corresponding washer systems in series were used to process the pulp following the brown stock washing. No chemicals were introduced during the extensive washing process. The total retention time in the extensive washing process was about 12 hours and the washing temperature was between about 90° C. to 98° C. For pulp samples made in accordance with the conventional washing techniques, the same washing cycle was used with the same retention time of 12 hours. However, the washing temperature was between about 55° C. to 60° C.

TABLE 1

Key Properties of Fibers Made from Normal and Preferred Processes

| Washing Scheme | COD Content (kg/ton pulp) | Sodium Content (kg/ton pulp) | Mean Fiber Length (mm) | Fiber Strength (ZST Wet) (km) |
| --- | --- | --- | --- | --- |
| Conventional Process Temp. (55-60° C.) | 5 | 0.49 | 2.73 | 11.76 |
| Elevated Temperature (90-98° C.) | 2.8 | 0.21 | 2.71 | 11.81 |

As shown in Table 1, the extensive washing at an elevated temperature reduces the COD content and sodium content of the pulp by about 50%. The COD and sodium contents are general indications of pulp cleanliness or extensiveness of washing. The COD content was measured by first dispersing the fiber into 0.01N NaOH solution, blending the solution for about 10 minutes at about 3200 rpm, then filtering the pulp with Watman #3 qualitative filter paper to obtain the filtrate, and measuring the COD content of the filtrate in accordance with Hach Method 8000 (dichromate reactor digestion and colorimetric measurement). The sodium content was measured in accordance with TAPPI method T 266 om-88 (TAPPI: Technical Association of Pulp & Paper Industry, USA).

Furthermore, as Table 1 shows, the extensive washing process of the preferred embodiment did not compromise critical fiber properties such as fiber length and fiber strength as the values for these two properties remain substantially the same for samples processed through the extensive washing process at the elevated temperature and those processed through the conventional washing cycles. The weighted average fiber length was measured by FS-200 (a fiber analyzer manufactured by Valmet). The zero span tensile (ZST) fiber strength was tested in accordance with TAPPI method T231 cm-85. Advantageously, the pulping process of the preferred embodiments can be applied to the manufacture of fiber cement grade pulps and can reduce the COD content of the fiber pulps by about 50% or more without adversely affecting key fiber physical and mechanical properties. It will be appreciated that pulp COD content can be reduced by about 20% or more under appropriate conditions. Furthermore, the pulp manufacturing process can be implemented in a cost-effective manner using existing equipment and processes in most fiber cement processing mills.

One preferred formulation of the fiber reinforced composite material comprises a cementitious binder, an aggregate, low COD and high purity cellulose fibers, density modifiers, and various additives to improve different material properties. It will be appreciated that not all of these components are necessary to formulate a suitable building product, and thus, in certain embodiments, the formulation may simply comprise cementitious binder and low COD cellulose fibers. Most of the embodiments described herein can be encompassed by the following formulation:

about 10%-80% cementitious binder;
about 20%-80% silica (aggregates);
about 0%-80% density modifiers;
about 0%-10% additives; and
about 0.5%-20% low COD and high purity cellulose fibers or a combination of low COD cellulose fibers and/or natural inorganic fibers, and/or synthetic fibers; and/or regular cellulose fibers.

A low COD fiber preferably refers to a fiber having a COD content less than about 5 kg/ton, more preferably less than about 3.5 kg/ton of pulp.

The cementitious binder is preferably Portland cement but can also be, but is not limited to, high alumina cement, lime, high phosphate cement, and ground granulated blast furnace slag cement, or mixtures thereof.

The aggregate is preferably ground silica sand but can also be, but is not limited to, amorphous silica, micro silica, geothermal silica, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides, and polymeric beads, or mixtures thereof.

The density modifiers can be organic and/or inorganic lightweight materials with a density of less than about 1.5 $g/cm^3$. The density modifiers may include plastic materials, expanded polystyrene, other foamed polymer materials, glass and ceramic materials, calcium silicate hydrates, microspheres and volcanic ashes including perlite, pumice, shirasu, zeolites in expanded forms. The density modifiers can be natural or synthetic materials.

The additives can include, but are not limited to, viscosity modifiers, fire retardant, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, and polymeric resin emulsion, or mixtures thereof.

The low COD and high purity cellulose fibers are preferably individualized fibers, and are unrefined/unfibrillated or refined/fibrillated cellulose pulps from sources, including but not limited to bleached, unbleached, semi-bleached cellulose pulp produced by pulping processes such as Kraft, Kraft-AQ, oxygen delignification, organic solvent pulping, sulfite pulping, steam explosion pulping or any other pulping techniques. The cellulose pulps can be made of softwood, hardwood, agricultural raw materials, recycled waste paper or any other forms of lignocellulosic materials.

Preferably, the low COD and high purity fibers have a freeness of 150 to 600 degrees of Canadian Standard Freeness (C SF) in accordance with TAPPI method T 227 om-99. The cement and silica preferably have surface areas of about 250 to 400 $m^2/kg$ and about 300 to 450 $m^2/kg$, respectively. The surface area for both the cement and silica is tested in accordance with ASTM C204-96a.

Test Results—Mechanical & Physical Properties

Applications of low COD and high purity fibers in fiber reinforced composite materials desirably improve the mechanical and physical properties of the final building product. Fiber cement products using low COD and high purity cellulose fibers have improved physical and mechanical properties.

TABLE 2

Key Mechanical Properties of Fiber Cement Composite Materials
Using Low COD Cellulose Fiber and High COD Cellulose Fiber

| Specimen Of Fiber Cement Composite | COD Content in Oven Dried Pulp (kg/ton of pulp) | COD Content in 4% Pulp Slurry (mg/L) | Modulus of Rupture (MOR) (MPa) | Modulus of Elasticity (MOE) (GPa) | Ultimate Strain (um/m) | Toughness (J/m³) |
|---|---|---|---|---|---|---|
| A | 5 | 63 | 6.16 | 2.29 | 6003 | 4.58 |
| B | 2.8 | 37 | 8.89 | 3.36 | 9304 | 6.43 |

Table 2 above provides an illustrative comparison of various mechanical and physical properties of fiber cement products made with formulations that incorporate low COD fibers made in accordance with preferred embodiments and those that use conventional cellulose fibers. Prototype samples of fiber cement materials are produced based on two equivalent formulations (A and B). An equivalent formulation is herein defined as one in which the preferred low COD fibers are displaced by an equivalent percentage of conventional cellulose fibers. Formulations A and B each comprises about 35% Portland cement, about 55% silica and about 10% fibers. Formulation A contains high COD fibers while Formulation B incorporates low COD fibers. Other key properties for the fibers were the same for both formulations: fiber length, about 2.58 mm; Kappa number, about 26; and freeness, about 472 CSF. The Kappa and freeness were measured in accordance with TAPPI method T236 and T 227 om-99, respectively. Both fibers were made from the wood species predominately Douglas fir (>90%) by Kraft process. The fibers were first refined to the pre-determined freeness at 4% consistency, mixed with other ingredients and formed into articles. The articles were then pre-cured at ambient temperature for 12 hours and then autoclaved for 12 hours at 180° C. All mechanical properties were tested under the wet condition in accordance with ASTM (American Standard Test Method) C1185-98a entitled "Standard Test Methods of Sampling and Testing Non-Asbestos Fiber-Cement Flat Sheet, Roofing and Siding Shingles, and Clapboards."

Table 2 shows that incorporation of low COD fibers in the fiber cement matrix can significantly improve the key physical and mechanical properties of the fiber cement composite materials as compared to samples made with an equivalent formulation that does not contain low COD fibers. For example, the low COD fibers improve the modulus of rupture (MOR) by about 44%, modulus of elasticity (MOE) by about 46%, ultimate strain by about 54%, and toughness by about 40%.

It will be appreciated that by varying the washing and/or other process conditions, and accordingly by lowering the COD content in the fibers, the improvement in these and other properties can be selectively controlled. Thus, in one embodiment, the low COD fibers can improve the MOR by about 10% or more, more preferably by about 20% or more, as compared to an equivalent formulation made with high COD (i.e., equal or higher than 5 kg/ton of pulp). Similarly, the low COD fibers can improve the MOE by about 10% or more, more preferably by about 20% or more. The low COD fibers can also improve the ultimate strain by about 10% or more, more preferably by about 20% or more. The low COD fibers can also improve the toughness of the composite building material by about 10% or more, more preferably by about 20% or more.

Due to the high reinforcement efficiency of low COD fibers, a smaller amount of the low COD and high purity fiber may be required to achieve the same reinforcement efficiency, compared to the regular fibers. It can be appreciated that the advantages of incorporating the low COD and high purity fibers in the fiber cement composite materials may not be limited to the above formulations and properties.

A preferred method of manufacturing a fiber reinforced composite building material incorporating the low COD fibers described herein above generally comprises the following steps:
  preparing cellulose fibers containing low COD components and other impurities;
  dispersing the low COD and high purity fibers at a preselected consistency;
  fibrillating the low COD and high purity fibers to a preselected freeness range;
  mixing the low COD and high purity fibers with ingredients to form a fiber cement mixture in accordance with the preferred formulations;
  fabricating/forming the fiber cement mixture into a fiber cement article of a pre-selected shape and size; and
  curing the fiber cement article so as to form the fiber reinforced composite building material.

Preferably, the step of mixing the low COD and high purity fibers with other ingredients to form a fiber cement mixture comprises mixing the low COD and high purity fibers with non-cellulose materials such as a hydraulic binder, aggregate, density modifiers, and additives in accordance with the preferred formulations of this invention. In some embodiments, the low COD and high purity fibers can also be mixed with regular cellulose pulp with high COD contents, natural inorganic fibers and synthetic fibers.

Figure 2:
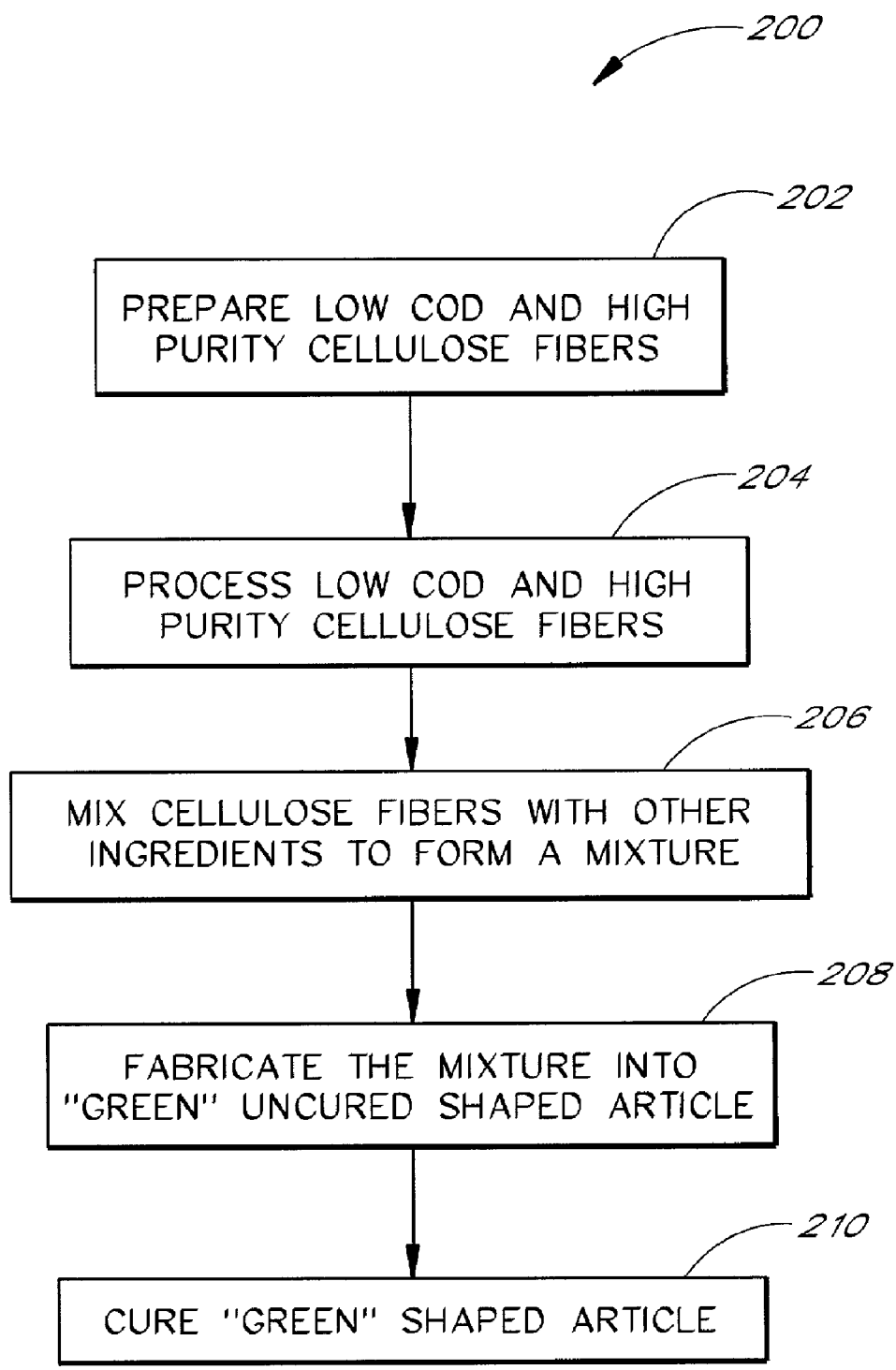
FIG. 2 is a flow chart of a preferred process of manufacturing fiber reinforced cement composite materials incorporating the low COD and high purity fibers.

FIG. 2 illustrates a preferred process 200 of manufacturing a fiber reinforced cementitious composite material incorporating low COD and high purity cellulose fibers. As FIG. 2 shows, the process begins with step 202 in which substantially all impurities in cellulose fibers have been removed in accordance with the methods described herein above. The low COD and high purity fibers are subsequently processed in step 204. The fiber processing step 204 typically involves fiber dispersion and fibrillation. In one embodiment, the fibers are dispersed at a consistency of about 1% to 6% in a hydra-pulper, which also imparts some fibrillation. Further fibrillation can be achieved using a refiner or series of refiners. Once dispersed, the fibers are then fibrillated to a range of about 100 to 750 degrees of CSF (Canadian Standard Freeness), more preferably between about 180 to 600 degrees of CSF. Dispersion and fibrillation can also be achieved by other techniques such as hammer-milling, deflakering, shredding, and the like. Furthermore, use of fibers without fibrillation is also acceptable for some products and processes. Most of residual COD impurities in the fiber will be released into the process water at this step.

As FIG. 2 shows, in step 206, the processed low COD cellulose pulps are proportionally mixed with the other ingredients to form a waterborne mixture, slurry, or paste. In one embodiment, the low COD and high purity cellulose fibers are mixed with cement, silica, a density modifier and other additives in a well-known mixing process to form a slurry or paste. In the mixer natural inorganic and synthetic fibers can be blended with the low COD fibers. The process 200 follows with step 208 in which the mixture may be formed into a "green" or uncured shaped article using a number of conventional manufacturing as would be known to one of skillful in the art, such as:

Hatschek sheet process;
Mazza pipe process;
Magnani process;
Injection molding;
Extrusion;
Hand lay-up;
Molding;
Casting;
Filter pressing;
Fourdrinier forming;
Multi-wire forming;
Gap blade forming;
Gap roll/blade forming;
Bel-Roll forming; and
Others.

These processes may also include a pressing or embossing operation after the article is formed. More preferable, no pressing is used. The processing steps and parameters used to achieve the final product using a Hatschek process are similar to what is described in Australian Patent No. 515151.

Following step 208, the "green" or uncured shaped article is cured in step 210. The article is preferably pre-cured for up to 80 hours, most preferably 24 hours or less. The article is then air-cured for approximately 30 days. More preferably, the pre-cured articles is autoclaved at an elevated temperature and pressure in a steam saturated environment at about 60 to 200° C. for about 3 to 30 hours, more preferably about 24 hours or less. The time and temperature chosen for the pre-cure and cure processes are dependent on the formulation, the manufacturing process, the process parameters, and the final form of the product.

Figure 3:
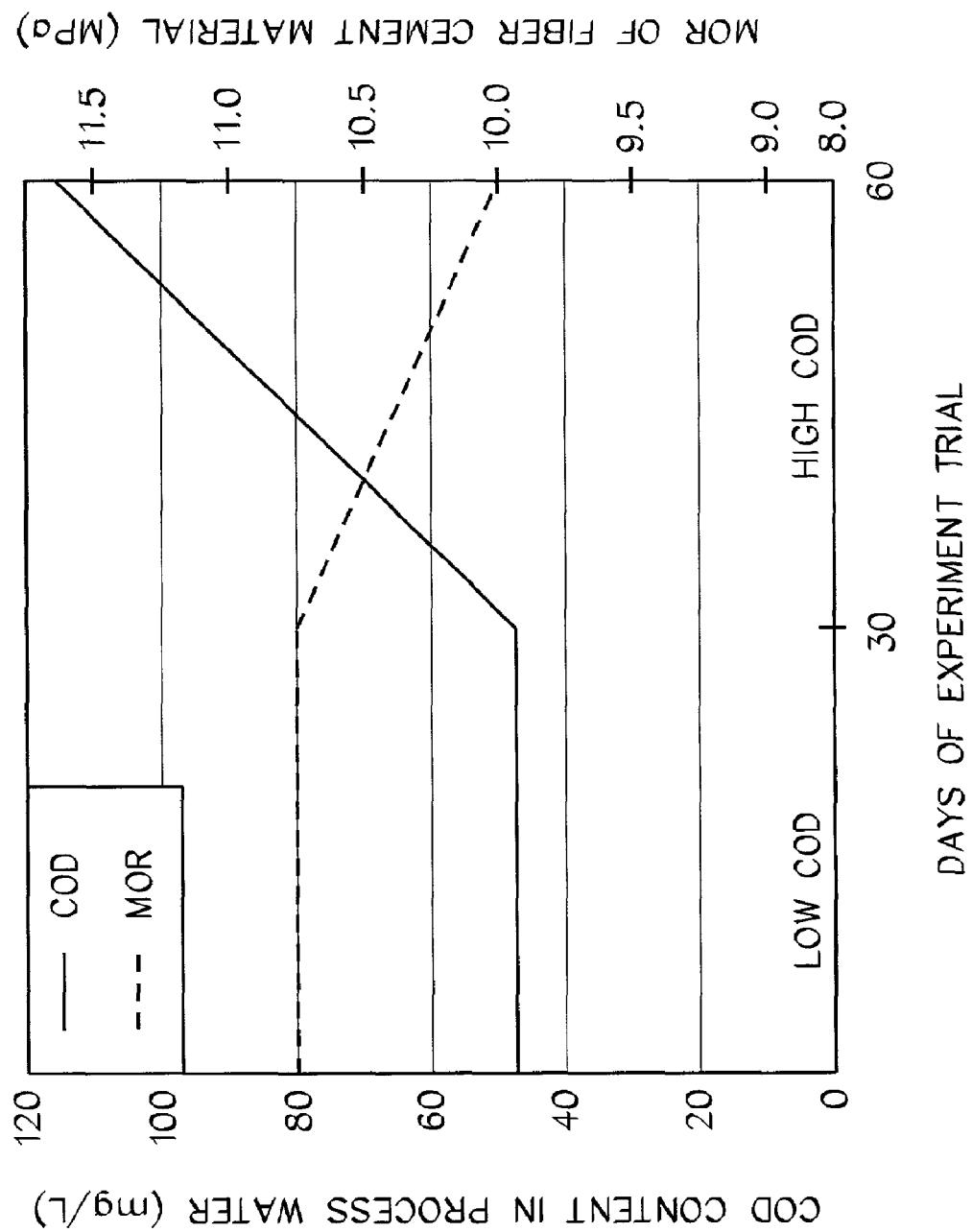
FIG. 3 illustrate the relationship between COD content in the pulps and the strength of the final fiber cement products and level of contamination in the process water during the manufacture of the fiber cement materials.

FIG. 3 shows the effects of COD contents in the pulp on the amount of contaminants released to the process water and the modulus of rupture (MOR) of the fiber reinforced cement composite material. As illustrated in FIG. 3, low COD fibers were added at the 0 day mark, and over a 30 day trial, the average COD in the process water and the MOR remained fairly constant. At 30 days, regular fibers were added to the mixture, resulting in increased contamination of the process water or a large amount of COD released to the process water, and decreased modulus of rupture (MOR) of the final cement product (measured after curing step 210). In particular, the average COD in the process water is about 50 mg/L when low COD fibers are used, while the average COD in the process water can reach as high as about 115 mg/L within weeks of experimental trial after regular fibers are added. Therefore, the use of low COD fibers reduces the amount of COD in the process water by about 50% compared to the use of regular fibers that are not treated as described above. It will be appreciated, however, that a reduction in COD content in the process water of about 10% or more will be significant for improvement in properties of the fiber cement composite materials, and for reducing the fresh water usage in the manufacture process.

The low COD pulp used in the example shown in FIG. 3 was made by using the extensive washing technique described in above embodiments. The freeness of the pulps was about 400 CSF. The fiber cement material was fabricated by a Hatschek process and autoclave curing technique. The fiber cement material made with the high COD pulp is based on an equivalent formulation, in which the low COD pulp is displaced by an equal amount of regular fiber pulp. The formulation of the fiber cement composite materials in this example contained:

about 8% fiber pulp;
about 35% Portland cement; and
about 57% ground silica.

The preferred embodiments provide a technique for removing COD components/impurities from cellulose pulps in the manufacture of fiber cement grade pulps. Specifically, the preferred embodiments disclose the implementation of an additional extensive washing process in the pulp processing cycle, preferably after the digester, and during or after the brown stock washer system. One embodiment of this invention utilizes the existing equipment available in bleaching plants at most fiber cement pulp mills to carry out an extensive counter-current pulp washing at a normal or elevated temperature. Preferably, the multiple bleaching towers, which are typically a series of continuous plug flow reactors, are utilized to soak the pulps and diffuse COD and other impurities out from cellulose cell walls to the bulk solution. The washers in the bleaching plants subsequently remove the COD and other impurities by dewatering the pulp and transferring the unwanted components to the wastewater. Advantageously, the technique of the preferred embodiments is capable of generating pulps with low COD contents and high purity while maintaining fiber strength, fiber lengths, and other key fiber properties that are important to manufactures of fiber reinforced cement composite materials. Furthermore, the technique is simple to implement and requires no addition of chemicals in some embodiments. The technique can reduce COD content of the pulp by about 20% to 80%. Incorporation of the low COD fibers in the fiber cement composite material in accordance with the formulations and manufacture method of the present invention improves various physical and mechanical properties of the final product, and reduces the fresh water usage in the manufacturing process.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A method of manufacturing cellulose fibers having reduced chemical oxygen demand (COD) components adapted for use in fiber-reinforced cementitious products, said method comprising:

processing a fibrous material in a reactor to form a brown stock pulp;

washing said brown stock pulp through a series of aqueous solutions at elevated temperatures, wherein the temperature of each of said aqueous solutions is greater than 65° C.;

removing said washed brown stock pulp from the series of aqueous solutions;

soaking said washed brown stock pulp in a series of diffusion solutions at elevated temperatures, wherein the temperature of each of said diffusion solutions is greater than 65° C., wherein the individual retention time of the washed brown stock pulp in each of said diffusion solutions is between about 30 minutes to 2 hours, wherein the cumulative retention time of the washed brown stock pulp in the series of diffusion solutions is greater than 7.5 hours and less than 36 hours; and processing said washed brown stock pulp to form cellulose fibers having a COD content of less than about 5 kg/ton of oven dried pulp.

2. The method of claim 1, wherein fresh water is introduced into one or more of the diffusion solutions in a countercurrent manner during soaking of the washed brown stock pulp in said diffusion solutions.

3. The method of claim 2, wherein soaking said washed brown stock pulp comprises soaking the pulp in a series of reactors.

4. The method of claim 3, wherein soaking said washed brown stock comprises soaking the pulp in up to six reactors.

5. The method of claim 4, wherein the reactors are bleaching towers.

6. The method claim 1, wherein the temperature of each of said diffusion solutions is between 65° C. and 120° C.

7. The method of claim 1, wherein the cumulative retention time is between about 7.5 hours to 30 hours.

8. The method of claim 1, wherein said washed brown stock pulp is maintained at a pulp consistency of about 1% to 30% in each of said diffusion solutions.

9. The method of claim 1, wherein soaking said washed brown stock pulp comprises soaking said pulp in washing systems selected from the group consisting of washers, storage tanks, reactors, mixers, agitators, pumps, centrifuges, and filter presses.

10. The method of claim 1, wherein soaking said washed brown stock pulp comprises soaking said pulp in washing systems selected from the group consisting of bleaching reactors, bleached stock washers, pulp transportation pumps, pulp dispersion/diffusion screw feeders, stock mixers and agitators, bleached stock storage towers, and bleached stock deckers.

* * * * *